United States Patent
Namineni et al.

(10) Patent No.: US 10,377,346 B2
(45) Date of Patent: Aug. 13, 2019

(54) ANTICIPATORY VEHICLE STATE MANAGEMENT

(71) Applicant: GM Global Technology Operations LLC, Detroit, MI (US)

(72) Inventors: Pavan K. Namineni, Ann Arbor, MI (US); Donald K. Grimm, Utica, MI (US); Xi Ju, Troy, MI (US); Mofei Liu, Westland, MI (US); Bernard Laurus, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 134 days.

(21) Appl. No.: 15/596,074

(22) Filed: May 16, 2017

(65) Prior Publication Data

US 2018/0334138 A1 Nov. 22, 2018

(51) Int. Cl.
*B60R 25/24* (2013.01)
*G06F 9/4401* (2018.01)
(Continued)

(52) U.S. Cl.
CPC .......... *B60R 25/246* (2013.01); *B60R 16/037* (2013.01); *B60R 25/04* (2013.01);
(Continued)

(58) Field of Classification Search
CPC .... G06F 1/3231; G06F 9/4401; G06F 21/575; G06F 9/4416; B60R 25/01; B60R 25/24;
(Continued)

(56) References Cited

U.S. PATENT DOCUMENTS

| 8,751,065 B1 * | 6/2014 | Kato | H04M 1/72533 |
| | | | 340/426.13 |
| 8,938,332 B1 * | 1/2015 | Zhang | B60W 10/30 |
| | | | 701/36 |

(Continued)

FOREIGN PATENT DOCUMENTS

| DE | 102013004178 A1 * | 9/2013 |
| KR | 1020100040554 A * | 4/2010 |
| KR | 1020100040768 A * | 4/2010 |

OTHER PUBLICATIONS

KIPO machine translation of KR 1020100040554 (original KR document published Apr. 20, 2010) (Year: 2010).*

(Continued)

*Primary Examiner* — Behrang Badii
*Assistant Examiner* — David A Testardi
(74) *Attorney, Agent, or Firm* — Reising Ethington P.C.; David Willoughby

(57) ABSTRACT

A system and method of providing one or more vehicle functions at a vehicle, the method including: when the vehicle is in a powered off state, periodically scanning for short-range wireless communication (SRWC) devices using a SRWC chipset and, as a result of the scanning, receiving a connection request from a mobile device; in response thereto, establishing a SRWC connection with the mobile device using the SRWC chipset; after establishing the SRWC connection, authorizing the mobile device to access one or more vehicle functions; then, performing an initialization suite of operations, wherein the initialization suite of operations includes initializing at least one vehicle system module, and wherein the initialization suite of operations is performed in response to a predictive user determination (Continued)

indicative of an imminent user interaction with the vehicle; and executing the initialization suite of operations at the vehicle.

16 Claims, 3 Drawing Sheets

(51) Int. Cl.
| | |
|---|---|
| H04W 76/10 | (2018.01) |
| G08C 17/02 | (2006.01) |
| B60R 25/04 | (2013.01) |
| H04W 4/80 | (2018.01) |
| B60R 16/037 | (2006.01) |
| G06F 1/3231 | (2019.01) |
| G06F 21/57 | (2013.01) |
| H04W 12/06 | (2009.01) |

(52) U.S. Cl.
CPC .......... *G06F 1/3231* (2013.01); *G06F 9/4401* (2013.01); *G06F 21/575* (2013.01); *G08C 17/02* (2013.01); *H04W 4/80* (2018.02); *H04W 76/10* (2018.02); *G08C 2201/34* (2013.01); *G08C 2201/93* (2013.01); *H04W 12/06* (2013.01)

(58) Field of Classification Search
CPC ... B60R 25/246; B60R 25/241; B60R 16/037; H04W 76/10; G08C 2201/93
See application file for complete search history.

(56) References Cited

U.S. PATENT DOCUMENTS

| | | | |
|---|---|---|---|
| 9,604,541 B1* | 3/2017 | Anter | B60K 37/02 |
| 9,842,448 B1* | 12/2017 | Lickfelt | G07C 9/00896 |
| 2008/0017705 A1* | 1/2008 | Costello | B60R 25/24 |
| | | | 235/380 |
| 2008/0305787 A1* | 12/2008 | Yamada | H04W 88/04 |
| | | | 455/426.1 |
| 2010/0075676 A1* | 3/2010 | Hyziak | H04W 36/30 |
| | | | 455/436 |
| 2012/0221173 A1* | 8/2012 | Ampunan | B60R 16/037 |
| | | | 701/2 |
| 2013/0054945 A1* | 2/2013 | Free | G06F 1/3203 |
| | | | 713/2 |
| 2013/0054986 A1* | 2/2013 | Kim | G06F 1/3234 |
| | | | 713/300 |
| 2014/0169564 A1* | 6/2014 | Gautama | G07C 9/00309 |
| | | | 380/270 |
| 2014/0195792 A1* | 7/2014 | Chew | G06F 1/3231 |
| | | | 713/2 |
| 2014/0240091 A1* | 8/2014 | Talty | G07C 9/00309 |
| | | | 340/5.62 |
| 2014/0242971 A1* | 8/2014 | Aladenize | G07B 15/00 |
| | | | 455/420 |
| 2015/0120151 A1* | 4/2015 | Akay | B60R 25/24 |
| | | | 701/49 |
| 2015/0212825 A1* | 7/2015 | Kim | G06F 9/4406 |
| | | | 713/2 |
| 2016/0063786 A1* | 3/2016 | Lewis | B60R 25/24 |
| | | | 340/5.72 |
| 2016/0225211 A1* | 8/2016 | Gehin | G07C 9/00309 |
| 2016/0244010 A1* | 8/2016 | Tseng | B60R 16/037 |
| 2016/0350536 A1* | 12/2016 | Grimes | G06F 21/575 |
| 2017/0083345 A1* | 3/2017 | Sol | G06F 21/35 |
| 2017/0092026 A1* | 3/2017 | Kowalewski | G07C 9/00007 |
| 2017/0151928 A1* | 6/2017 | Kang | B60R 25/04 |
| 2017/0197568 A1* | 7/2017 | DeCia | B60R 16/037 |
| 2017/0201928 A1* | 7/2017 | Kang | H04W 40/244 |
| 2018/0018179 A1* | 1/2018 | Scheufler | B60R 16/037 |

OTHER PUBLICATIONS

KIPO machine translation of KR 1020100040768 (original KR document published Apr. 21, 2010) (Year: 2010).*

* cited by examiner

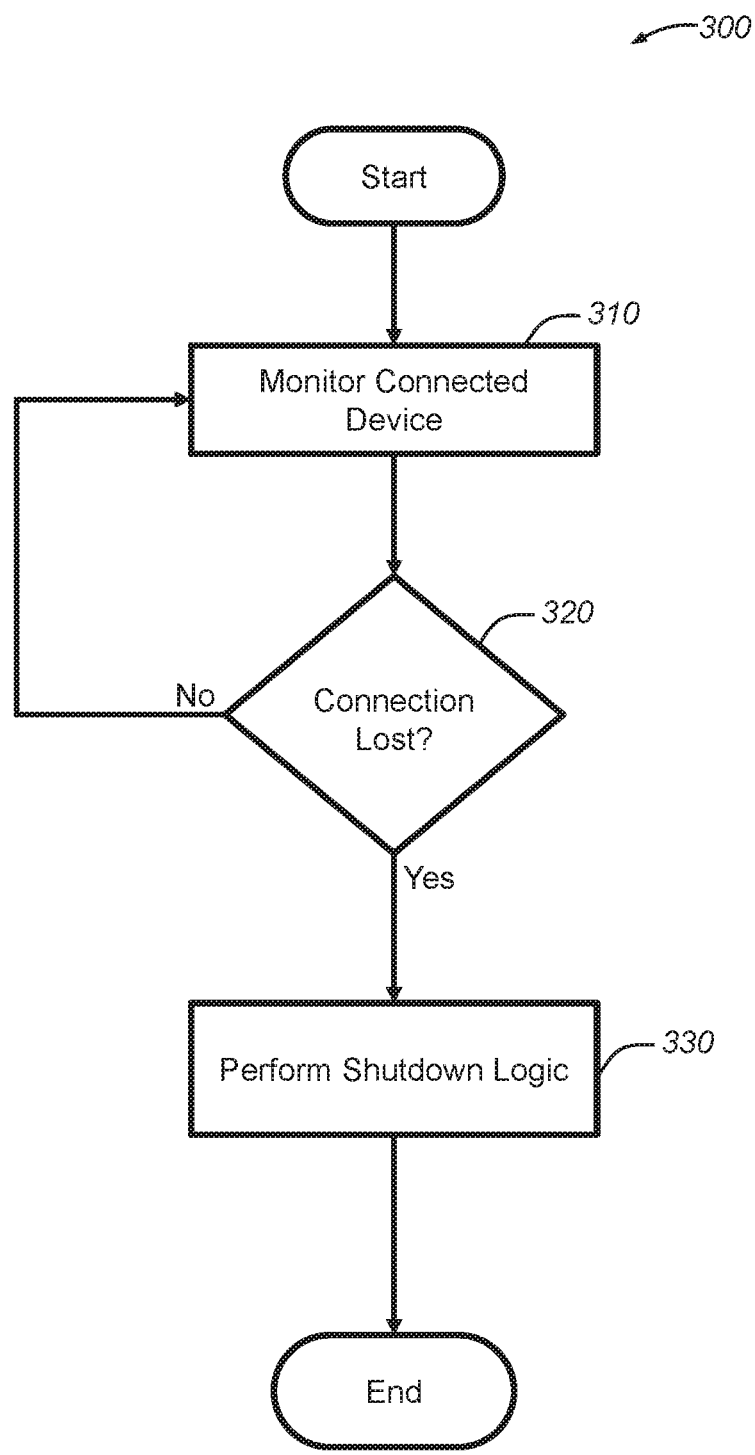

US 10,377,346 B2

ANTICIPATORY VEHICLE STATE MANAGEMENT

INTRODUCTION

The disclosure relates to automating operations carried out by a vehicle based on detecting operator arrival or presence at the vehicle.

Many electronic devices now carry out network communications. For example, many vehicles can transmit voice and data communications over both a short-range wireless network, such as Wi-Fi™, and a cellular network, such as GPRS or CDMA. Now, many vehicle components, devices, and modules desire to send to or receive data from a remote server, such as a vehicle backend service facility, or to short-range wireless (SRWC) devices, such as smartphones and other mobile devices. These SRWC devices, such as smartphones, may connect to a vehicle via short-range wireless communications (SRWC). Such SRWC connections or devices may be authorized and/or authenticated by the vehicle and, when properly authorized and authenticated, the mobile device may send information to the vehicle.

SUMMARY

According to a first aspect of the invention, there is provided a method of providing one or more vehicle functions at a vehicle, the method comprising: when the vehicle is in a powered off state, periodically scanning for short-range wireless communication (SRWC) devices using a SRWC chipset and, as a result of the scanning, receiving a connection request from a mobile device; in response to receiving the connection request from the mobile device, establishing a SRWC connection with the mobile device using the SRWC chipset; after establishing the SRWC connection, authorizing the mobile device to access one or more vehicle functions; after the mobile device is authorized, performing an initialization suite of operations, wherein the initialization suite of operations includes initializing at least one vehicle system module, and wherein the initialization suite of operations is performed in response to a predictive user determination indicative of an imminent user interaction with the vehicle, wherein the user interaction comprises at least one of the following: user approach to the vehicle, user operation of the vehicle, or user access to the vehicle; and executing the initialization suite of operations at the vehicle.

The method may further include any one or more of the following steps or features individually or in any technically feasible combination:

the steps of: detecting that an unauthorized or unauthenticated device is attempting to access the vehicle, attempting to command the vehicle to perform some operation, and/or attempting to establish a connection with the vehicle; and in response to the detection, carrying out one or more security measures, wherein the one or more security measures include locally issuing a vehicle disable command that disables one or more vehicle system modules;

wherein the vehicle disable command disables an engine control unit or body control unit that is included in the vehicle;

comprising the step of receiving a wireless command message from the mobile device, wherein the wireless command message includes an active command and/or a passive command, and wherein the predictive user determination is made based on the wireless command message;

the steps of: determining whether the wireless command message is valid; when it is determined that the wireless command message is valid, then carrying out the executing step; and when it is determined that the wireless command message is not valid, then waiting to receive another wireless command message from the mobile device;

wherein the wireless command message includes an active command that specifies a vehicle function to be carried out by the vehicle, and further comprising the step of carrying out the specified vehicle function at the vehicle;

the step of receiving a message from a remote device, wherein the message includes an authorized virtual vehicle key;

wherein the authorizing step includes the following: receiving a wireless message from the mobile device, wherein the wireless message includes a virtual key; comparing the virtual key to the authorized virtual key; and authorizing the mobile device if the virtual key corresponds to the authorized virtual key; and the steps of: detecting a loss of the SRWC connection between the mobile device and the vehicle; and in response to detecting the loss of the SRWC connection, carrying out a shutdown suite of operations, wherein the shutdown suite of operations includes setting the wireless communications device to operate in a low-power mode or sleep mode, wherein the wireless communications device in the low-power or sleep mode periodically scans for SRWC devices.

According to another aspect of the invention, there is provided a method of automatically carrying out at least one vehicle function at a vehicle, the method comprising: when the vehicle is in a powered off state, periodically scanning for short-range wireless communication (SRWC) devices using a SRWC chipset and, as a result of the scanning, receiving a connection request from a mobile device; in response to receiving the connection request from the mobile device, establishing a SRWC connection with the mobile device using the SRWC chipset; after establishing the SRWC connection, authorizing the mobile device to access one or more vehicle functions; after the mobile device is authorized, receiving a wireless command message from the mobile device, wherein the wireless command message indicates a vehicle function to be performed at the vehicle; determining that the received wireless command message is valid; when it is determined that the wireless command message is valid, then: performing the vehicle function specified in the wireless command message; and executing an initialization suite of operations, wherein the initialization suite of operations includes initializing at least one vehicle system module, wherein the initialization suite of operations is performed in response to a predictive user determination indicative of an imminent user interaction with the vehicle, wherein the user interaction comprises at least one of the following: user approach to the vehicle, user operation of the vehicle, or user access to the vehicle; and when it is determined that the wireless command message is not valid, then waiting to receive another wireless command message from the mobile device.

This method may further include any one or more of the following steps or features individually or in any technically feasible combination:

the steps of: detecting that an unauthorized or unauthenticated device is attempting to access the vehicle, attempting to command the vehicle to perform some operation, and/or attempting to establish a connection with the vehicle; and in response to the detection, carrying out one or more security measures, wherein the one or more security measures include locally issuing a vehicle disable command that disables one or more vehicle system modules;

wherein the vehicle disable command disables at least a portion of an engine control unit or a body control module that is included in the vehicle;

wherein the determining step further comprises the steps of verifying one or more authorization indicators that are included in the wireless command message;

the step of receiving a message from a remote device, wherein the message includes an authorized virtual vehicle key;

wherein the authorizing step includes the following: receiving a wireless message from the mobile device, wherein the wireless message includes a virtual key; comparing the virtual key to the authorized virtual key; and authorizing the mobile device if the virtual key corresponds to the authorized virtual key;

the steps of: detecting that the SRWC connection between the mobile device and the vehicle is lost; and in response to detecting that the SRWC connection is lost, carrying out a shutdown suite of operations, wherein the shutdown suite of operations includes setting the wireless communications device to operate in a low-power mode or sleep mode, wherein the wireless communications device in the low-power or sleep mode periodically scans for SRWC devices.

According to yet another aspect of the invention, there is provided a vehicle communications system included in a vehicle, comprising: a vehicle system module (VSM); and a wireless communication device, wherein the wireless communication device includes a short-range wireless communications (SRWC) chipset, a processor, and memory; wherein the wireless communication device is configured to: when the vehicle is in a powered off state, periodically scan for short-range wireless communication (SRWC) devices using the SRWC chipset and, as a result of the scanning, receive a connection request from a mobile device; in response to receiving the connection request from the mobile device, establish a SRWC connection with the mobile device using the SRWC chipset; after establishing the SRWC connection, authorize the mobile device to access one or more vehicle functions; after the mobile device is authorized, perform an initialization suite of operations, wherein the initialization suite of operations includes initializing at least one vehicle system module, and wherein the initialization suite of operations is performed in response to a predictive user determination indicative of an imminent user interaction with the vehicle, wherein the user interaction comprises at least one of the following: user approach to the vehicle, user operation of the vehicle, or user access to the vehicle; and execute the initialization suite of operations at the vehicle.

In other embodiments, the vehicle communications system may include any one or more of the following in any technically feasible combination: a telematics unit, a body control module, an engine control unit, a primary propulsion unit, a center stack module (CSM), an infotainment unit, a powertrain control module, or a transmission control unit.

BRIEF DESCRIPTION OF THE DRAWINGS

Exemplary embodiments will hereinafter be described in conjunction with the appended drawings, wherein like designations denote like elements, and wherein:

FIG. 3 is a flowchart illustrating a method of providing one or more vehicle functions at a vehicle.

DETAILED DESCRIPTION

The system and methods below enable a vehicle to provide certain vehicle functions upon a detection that a vehicle user is approaching the vehicle. In some scenarios, certain vehicle system modules and/or other vehicle components require a certain amount of time to boot or initiate. In such a scenario, it may be desirable for certain vehicle system modules and/or other vehicle components to boot or initiate in anticipation of a vehicle user arriving at the vehicle. Such anticipated arrival may be determined through accessing and/or evaluating a car sharing service registration record or other data that may indicate that a user may soon approach the vehicle. For example, in an embodiment where the vehicle is part of a car sharing service, a user may make a registration to use the vehicle a certain time using a short-range wireless communication (SRWC) device. The vehicle may periodically perform a scan using a short range wireless communications (SRWC) chipset and, through the scan, receive a connection request from the SRWC device and, in response to the received connection request, authorize the mobile device to access one or more vehicle functions. After the mobile device is authorized, the vehicle may receive a command from the SRWC device instructing the vehicle to perform one or more vehicle functions, such as to initialize a telematics or infotainment unit. In some embodiments, the vehicle may determine whether it is desirable to execute the command and then execute the command if desirable to do so. Alternatively, or additionally, upon authorization of the SRWC device, the vehicle may automatically carry out one or more functions or operations.

Figure 1:
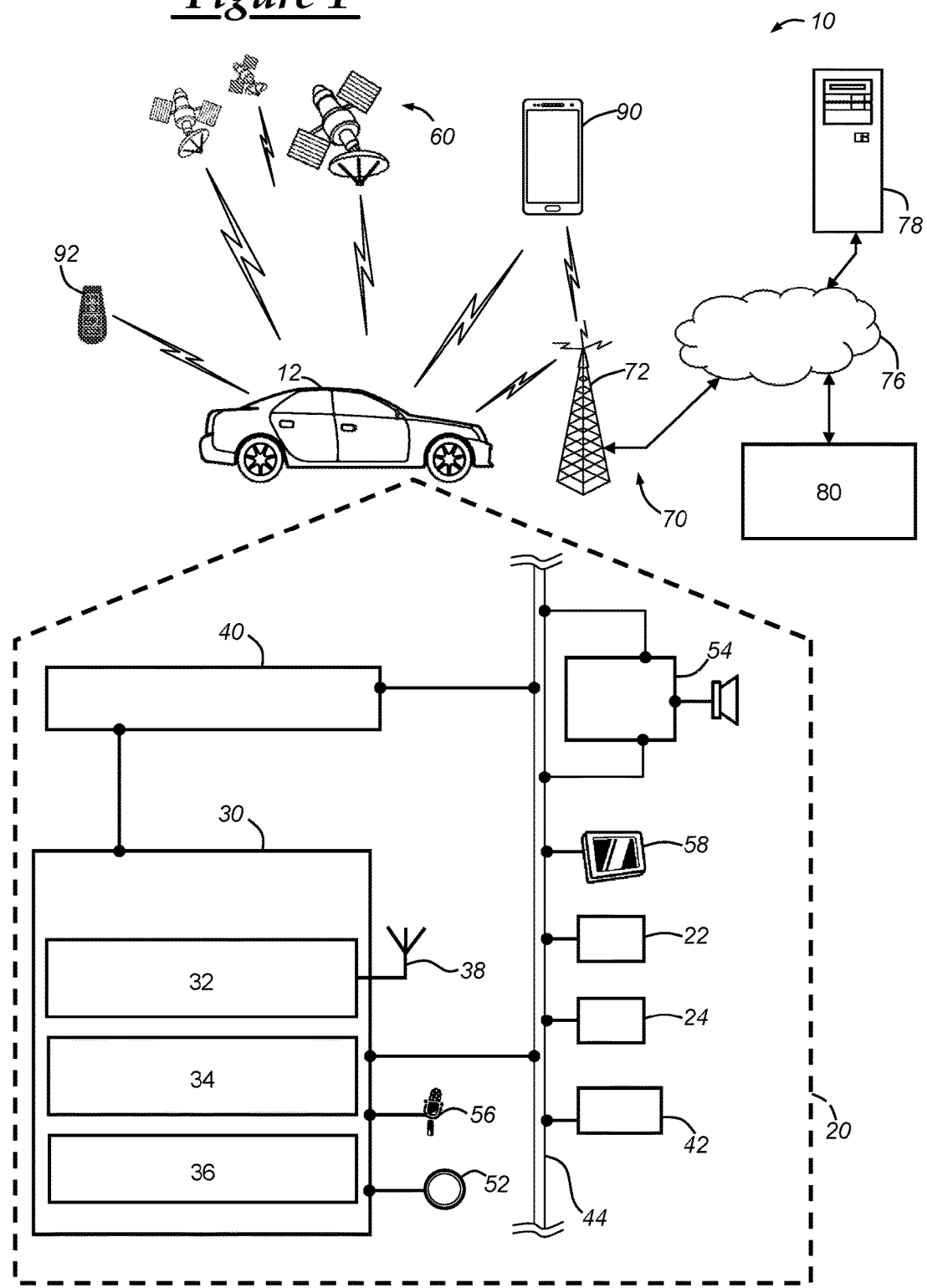
FIG. 1 is a block diagram depicting an embodiment of a communications system that is capable of utilizing the method disclosed herein.

Referring now to FIG. 1, there is shown an operating environment that comprises a communications system 10 and that can be used to implement the method disclosed herein. Communications system 10 generally includes a vehicle 12 with a wireless communications device 30, a constellation of satellites 60, one or more wireless carrier systems 70, a land communications network 76, a computer 78, a remote facility 80, a mobile device 90, and a passive entry device 92. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which include telematics equipment in vehicle 12). Carrier system 70 can implement any suitable communications technology, including for example GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as a web server accessible by vehicle 12. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to the vehicle 12.

Remote facility 80 may be designed to provide the vehicle electronics 20 and mobile device 90 with a number of different system back-end functions. For example, remote facility 80 may be used in part to implement a car sharing service. In such a case, remote facility 80 may coordinate registrations of vehicles, store data pertaining to the registrations or other aspects of the car sharing service, and/or provide authentication and authorization data to SRWC devices, users, and/or vehicles. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, profile records, behavioral patterns, and other pertinent subscriber information. Data transmissions may also be conducted by wireless systems, such as IEEE 802.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes the wireless communications device 30, a body control module (BCM) 40, a GPS module 22, engine control unit (ECU) 24, other VSMs 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GPS module 22, engine control unit (ECU) 24, wireless communications device 30, body control module (BCM) 40, vehicle user interfaces 52-58, as will be described in detail below. The vehicle 12 can also include other VSMs 42 in the form of electronic hardware components that are located throughout the vehicle and, which may receive input from one or more sensors and use the sensed input to perform diagnostic, monitoring, control, reporting, and/or other functions. For example, other VSMs may include a telematics unit, a center stack module (CSM), an infotainment unit, a powertrain control module, or a transmission control unit. Each of the VSMs 42 is preferably connected by communications bus 44 to the other VSMs, as well as to the wireless communications device 30, and can be programmed to run vehicle system and subsystem diagnostic tests. One or more VSMs 42 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Engine control unit (ECU) 24 may control various aspects of engine operation such as fuel ignition and ignition timing. ECU 24 is connected to communications bus 44 and may receive operation instructions from BCM 40 or other vehicle system modules, such as wireless communications device 30 or VSMs 42. In one scenario, the ECU 24 may receive a command from the BCM to start the vehicle—i.e., initiate the vehicle ignition or other primary propulsion system (e.g., a battery powered motor). In another scenario, the ECU 24 may be provided a signal from the wireless communications device 30 or BCM 40 that directs the ECU 24 to not perform any operations or at least to not start the vehicle's engine or primary propulsion system. This signal may be sent by device 30 or BCM 40 in response to receiving a remove vehicle disable (RVD) command from a computer 78 or remote facility 80, as will be discussed more below.

Wireless communications device 30 is capable of communicating data via short range wireless communications (SRWC). As shown in the exemplary embodiment of FIG. 1, wireless communications device 30 includes a wireless access point 32, a processor 34, memory 36, and one or more antennas 38 (only one is shown). In many embodiments, the wireless communications device 30 may be specifically configured to carry out the method disclosed herein. In one embodiment, wireless communications device 30 may be a standalone module or, in other embodiments, device 30 may be incorporated or included as a part of one or more other vehicle system modules, such as a center stack module (CSM), body control module, an infotainment module, a telematics module, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short range wireless communications (SRWC) such as any of the IEEE 802.11 protocols, Wi-Fi™, WiMAX™, ZigBee™, Wi-Fi Direct™, Bluetooth™, Bluetooth Low Energy™ (BLE), or near field communication (NFC). The SRWC chipset 32 enables the wireless communications device 30 to transmit and receive SRWC, such as BLE. The SRWC chipset may allow the device 30 to connect to another SRWC device. As used herein, a short range wireless communications (SRWC) device is a device capable of SRWC and may include a SRWC chipset. Additionally, in some embodiments, the wireless communications device may contain a cellular chipset thereby allowing the device to communicate via one or more cellular protocols, such as those used by cellular carrier system 70.

In one embodiment, the wireless communications device 30 may operate both when the vehicle is in a powered on state and when the vehicle is in a powered off state. As used herein, a "powered on state" is a state of the vehicle in which the ignition or primary propulsion system of the vehicle is powered on and, as used herein, a "powered off state" is a state of the vehicle in which the ignition or primary propulsion system (or primary mover) of the vehicle is not powered on. The operation or state of the wireless communications device 30 may be controlled by another vehicle system module, such as by the BCM 40 or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations.

For example, the wireless communications device 30 may be periodically woken up by BCM 40 and, subsequently, the device 30 may perform a scan using SRWC, such as Bluetooth Low Energy™. This scan may be carried out over a predetermined period of time or may be based on various other vehicle or environmental states. The vehicle may repeat this process until a wireless message is detected or until the vehicle is turned on (i.e., switched from a powered off state to a power on state). Upon detection of a SRWC device or receipt of a wireless message, the wireless communications device 30 may communicate with the SRWC device by transmitting and receiving one or more wireless messages. These messages may include authenticating or otherwise verifying the identity of the SRWC device which sent (or ostensibly sent) the wireless message, authorizing the SRWC device using one or more authorization techniques (as discussed more below), and/or pairing the SRWC device and the wireless communications device 30 (e.g., such as through Bluetooth™ or Bluetooth Low Energy™ pairing).

Once a connection is established between the wireless communications device 30 and the SRWC device, which may be mobile device 90, then the wireless communications device 30 may wait for a wireless message from the SRWC device that includes a specific command or function. Once device 30 receives such wireless message, the vehicle may authenticate and/or authorize the message and/or the SRWC device. Thereafter, the command or function may be interpreted, modified, and/or passed along to a specific VSM that is to perform the command or function. Alternatively, a new message based on the command or function may be generated and sent to another VSM.

The authorization and/or authentication of the SRWC device may include verifying the identity of the SRWC device and/or the user of the SRWC device, as well as checking for authorization of the SRWC device and/or the user of the SRWC device. This verification may include comparing a key (e.g., a string or array of bits) included in the connection request (or subsequent message) with a key that the vehicle obtained from a remote facility 80. In one scenario involving a car sharing service, a user of the SRWC device may request to use the vehicle indefinitely or for a predetermined amount of time. Thus, a virtual key may be generated at a remote facility and sent to both the SRWC device and the vehicle for purposes of authorizing a user of the SRWC device to use the vehicle. The virtual key may include, be derived from, or associated in a database with a media access control (MAC) address of the SRWC device, a Bluetooth Address of the SRWC device, a mobile telephone number of the SRWC device, another identifier of the SRWC device, a personal identifier of a user of the device, or various other identifiers.

After authentication and/or authorization of the SRWC device, the vehicle may realize a predictive vehicle determination indicative of an imminent user interaction with the vehicle. The predictive vehicle determination may be made by the wireless communications device or other vehicle system module or may be made by the SRWC device to which the vehicle established a connection with. In the case where a SRWC device makes the predictive vehicle determination, the SRWC may send a wireless message via SRWC to the vehicle indicating such a determination.

The user interaction upon which the predictive vehicle determination is predicated may be one or more of the following: a user approach to the vehicle, a user operation of the vehicle, or a user access of the vehicle. Anticipated user interaction may be made using various vehicle system modules and/or SRWC devices. For example, the wireless communications device 30 may realize an increasing received signal strength indicator (RSSI) included in messages received from the SRWC device 90. Or, the vehicle may compare SRWC device information with reservation information that was received from a remote device. In such a case, the reservation information received from the remote device may include a time of day and/or a SRWC identifier (such as a media access control (MAC) address). The wireless communication device 30 may compare the time of day included in the reservation information to the present time of day and/or may compare the SRWC identifier included in the reservation information to a SRWC identifier of the SRWC device to which the wireless communication device established a connection with.

In one embodiment, if the vehicle determines that a user is approaching the vehicle, the vehicle may, in anticipation of use and/or operation of the vehicle by the user, carry out one or more vehicle functions. For example, upon a determination that a user is approaching the vehicle (which may indicate the user or operation of the vehicle momentarily or imminently), the vehicle may perform certain operations or vehicle functions to place the vehicle in a more ready or desirable state, which may, in some embodiments, enhance the user's experience.

A vehicle function is any function or operation that may be performed by the vehicle, including initiating or booting a telematics unit, a GPS module, an infotainment unit, a center stack module (CSM), or other VSM. Additionally, a vehicle function may be unlocking or locking the vehicle doors via BCM 40, starting the ignition or primary propulsion system of the vehicle, disabling/enabling the vehicle ignition or primary propulsion system, heating or cooling passenger seats included in the vehicle, performing air conditioning or heating of the vehicle cabin, turning off/on or flashing headlights or other lights included in the vehicle, emitting an audible sound using a vehicle horn or speakers (such as those included in audio system 54), downloading information (e.g., information pertaining to a car sharing service reservation) or content data (e.g., audio/video playlists or files) from a remote facility 80 or computer 78 (including information that may be particular to the user of the SRWC device and/or associated with the SRWC device), downloading or uploading information and/or content data from or to the SRWC device, and/or performing various other operations or functions of the vehicle, many of which are described herein. Additionally, some vehicle functions may be modified, enabled, or disabled based on certain conditions, including the present vehicle state, the weather or other environmental conditions, the identity of the SRWC device, and/or the time of day. For example, when the external air temperature is above 30 degrees Celsius, then the air conditioner may be initiated. Such vehicle functions may also be carried out upon the loss of connection of the SRWC device, the powering off of the vehicle, and/or upon a determination that a vehicle operator or passenger has departed the vehicle.

In addition to acting as a wireless access point (WAP) for devices to connect to, wireless communications device 30 may carry out wireless communications with another wireless access point, such as a non-vehicle wireless access point (WAP). In such an arrangement, the non-vehicle WAP may be connected to a router and provide device 30 a connection to the Internet or other remote network, such as via land network 76. Device 30 may be set to a station or a client mode and, thus, may then carry out wireless communications with the non-vehicle WAP. As used herein, a station or a client mode is an operating mode of a wireless communications device that enables the device to act as a station or client device thereby allowing the device to scan for and connect to host devices (e.g., wireless access points). More particularly, in the client mode, the client device permits another device (e.g., a server device) to control communication protocols, etc. The non-vehicle WAP may be set to a wireless access point mode and provide a hotspot for device 30 to connect to when operating in a station mode. A hotspot is an area where a wireless data connection may be established between a wireless device operating in a station or client mode and the device hosting the hotspot via a wireless access point. It should be appreciated that the protocol used in providing a hotspot is not limited to Wi-Fi™ and that any SRWC, such as those listed above, may be used.

Wireless communications device 30 may be in communication with one or more remote networks via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30 via, for example, a telematics unit included in the vehicle. In one embodiment, the communications device 30 may also include a cellular chipset or be communicatively coupled to a device comprising a cellular chipset such as a telematics unit. In either event, communications device 30 may, via a cellular chipset, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 34 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 34 executes various types of digitally-stored instructions, such as software or firmware programs stored in memory 36, which enable the device 30 to provide a wide variety of services. For instance, processor 34 can execute programs or process data to carry out at least a part of the method discussed herein. In one embodiment, device 30 includes an application that enables the method described below in FIG. 2. Memory 36 may include RAM, other temporary powered memory, any non-transitory computer-readable medium (e.g., EEPROM), or any other electronic computer medium that stores some or all of the software needed to carry out the various external device functions discussed herein.

Body control module (BCM) 40 is shown in the exemplary embodiment of FIG. 1 as being electrically coupled to wireless communications device 30 and communication bus 44. In some embodiments, the BCM 40 may be integrated with or part of a center stack module (CSM). Or, the BCM and CSM may be separate devices that are connected to one another via bus 44. BCM 40 may communicate with wireless communications device 30 and/or one or more vehicle system modules, such as GPS 22, audio system 54, or other VSMs 42. BCM may include a processor and memory such that the BCM may direct one or more vehicle operations including, for example, controlling central locking, air conditioning, and power mirrors. BCM 40 may receive data from wireless communications device 30 and, subsequently, send the data to one or more vehicle modules. Additionally, BCM may receive commands or instructions to perform certain vehicle operations or functions from wireless communications device 30, as will be discussed more below.

Global position system (GPS) module 22 receives radio signals from a constellation of GPS satellites 60. From these signals, the module 22 can determine vehicle position which may enable the vehicle to determine whether it is at a known location, such as home or workplace. Moreover, GPS module 22 can provide this location data to wireless communications device 30, which can then use this data to identify known locations, such as a vehicle operator's home or workplace. Additionally, GPS module 22 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GPS module 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management and/or for use in a car sharing service. Also, new or updated map data can be downloaded to the GPS module 22 from the remote facility 80 via a vehicle telematics unit.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Vehicle 12 can also communicate wirelessly, via short range wireless communication (SRWC) such as the IEEE 802.11 or Bluetooth Low Energy™ protocols mentioned above, with mobile device 90 or passive entry technology keyfob or other key, referred to herein as a passive entry key (PEK) 92. PEK 92 may comprise a body that includes one or more switches or buttons for user interaction; further, the body may carry a processor, memory, and a wireless transmitter for the SRWC. As will be appreciated by those skilled in the art, the PEK memory may store and transmit a cryptographic key used for PEK validation at the vehicle. Some functions of the PEK 92 with the vehicle 12 may be passive (e.g., not requiring manual input by the user) such as enabling unlocking of the vehicle doors when the PEK is in the proximity of the vehicle, while other functions may require active input, such as a button press on the PEK 92 to, for example, unlatch a trunk of the vehicle. In any event, transmission of a wireless signal that includes the cryptographic key may initiate or control one or more of the vehicle functions such as locking and unlocking doors, starting the vehicle, operating a vehicle alarm system, operating a vehicle trunk release, etc.

The mobile device 90 is a SRWC device and may include: hardware, software, and/or firmware enabling cellular telecommunications and SRWC as well as other mobile device applications. The hardware of the mobile device 90 may comprise: a processor and memory (e.g., non-transitory computer readable medium configured to operate with the processor) for storing the software, firmware, etc. The mobile device processor and memory may enable various software applications, which may be preinstalled or installed by the user (or manufacturer) (e.g., having a software application or graphical user interface or GUI). One implementation of a vehicle-mobile device application may enable a vehicle user to communicate with the vehicle 12 and/or control various aspects or functions of the vehicle, some of which are listed above. Another implementation may enable the user to make a reservation to use a vehicle that is a part of a car sharing service. Additionally, the application may also allow the user to connect with the remote facility 80 or call center advisors at any time.

In some embodiments, mobile device 90 may be able to act as a passive entry key, such as PEK 92 described above. For example, as discussed above, the mobile device may be provided a key or other information that authorizes the device to access the vehicle. Such a scenario may be implemented in conjunction with a car sharing service whereby a remote facility coordinates car rentals or ride sharing, such as remote facility 80. The remote facility may generate and issue a virtual key (e.g., a string or array of bits) to the mobile device 90 and to the vehicle 12. The mobile device 90 may then securely pass the virtual key to the vehicle (e.g., via an established SRWC connection) and the vehicle may then determine if the virtual key is authorized to access the vehicle and/or the level of access the virtual key provides or is associated with (e.g., full vehicle functionality, only unlocking/locking features). The application may enable such virtual key management and functionality. As will be discussed in more detail below, once the vehicle authenticates and/or authorizes the virtual key (or the mobile device or the user of the mobile device), the vehicle may automatically carry out one or more vehicle functions or may receive one or more commands from the mobile device, wherein the one or more commands instruct the vehicle to perform one or more vehicle functions or a suite of functions, as will be discussed more below.

Figure 2:
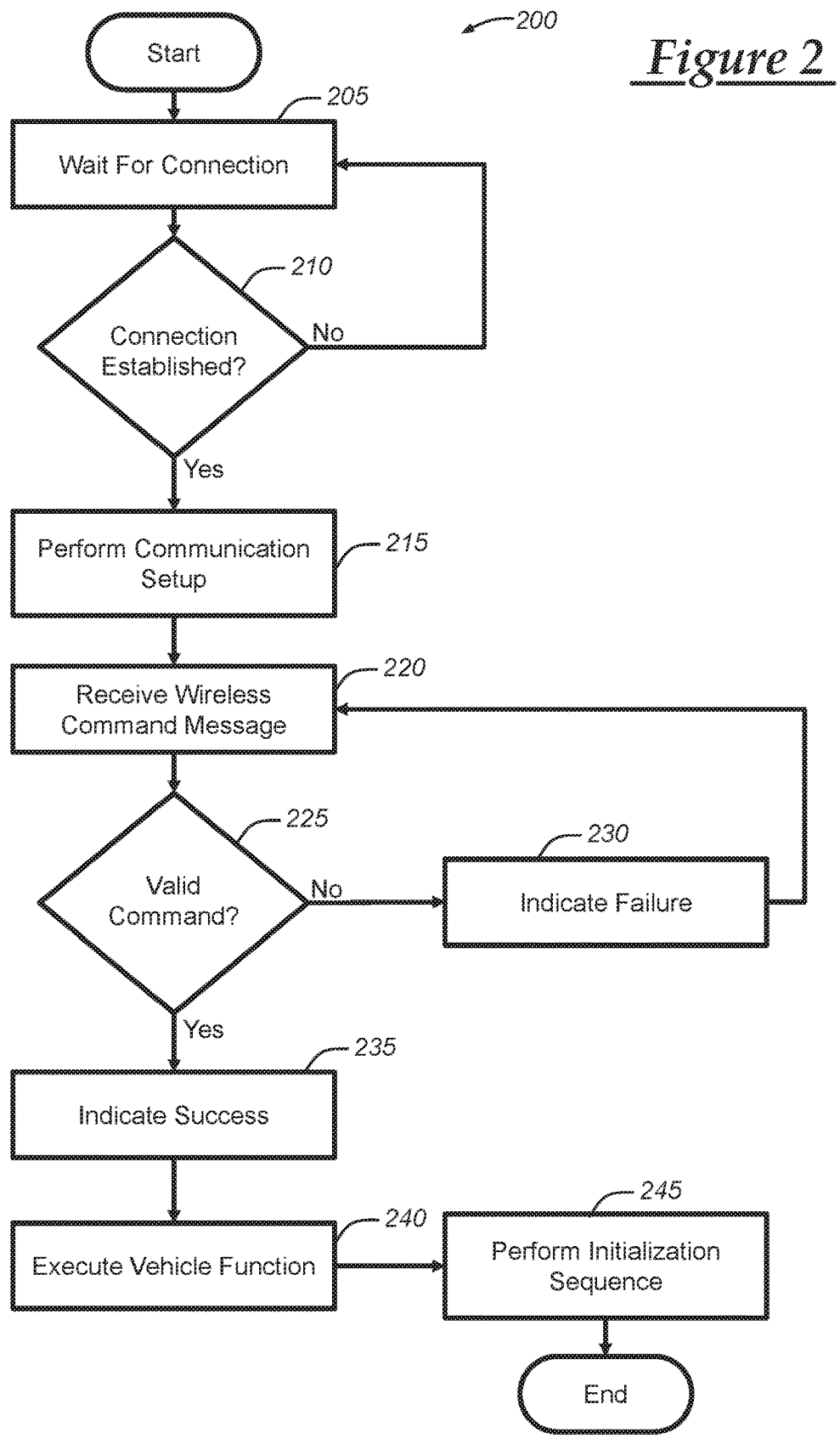
FIG. 2 is a flowchart illustrating a method of providing one or more vehicle functions at a vehicle.

With reference to FIG. 2, there is shown an embodiment of a method 200 of automatically carrying out at least one vehicle function at a vehicle. The method 200 may be carried out in part or in whole by the wireless communications device 30. Method 200 may be used in various scenarios. In one scenario, vehicle 12 may be used as part of a car sharing service. In such a scenario, a remote device (e.g., computer 78 or other device at a remote facility 80) may receive a request to use a vehicle from a SRWC device, such as mobile device 90. The remote device may then process the request by identifying a vehicle that may appropriately fulfill the request, such as a vehicle available during times specified in the request and/or a vehicle that is within a certain proximity of the user or a desired location. Then, vehicle 12 and/or SRWC device 90 may be provided certain information pertaining to the vehicle 12, the SRWC device 90, and/or the user of the SRWC device. Specifically, the vehicle 12 may be provided with an identifier of the SRWC device 90 or the user, which may have been initially designated in the request or reservation sent from device 90. Likewise, the SRWC device 90 may be provided with a vehicle identifier, such as a vehicle identification number (VIN) or a media access control (MAC) address of the wireless communications device 30. By providing these identifiers to the other device, this may also enable the wireless communications device 30 or SRWC 90 to transmit a directed wireless message (or advertisement) indicating their SRWC capabilities. Thus, the pairing and/or connection establishment of the wireless communications device 30 and the SRWC device 90 may be facilitated, expedited, or simplified. Additionally, other information may be provided by a remote device, such as a virtual key, which will be discussed more below (step 215).

Method 200 begins with step 205 wherein the wireless communications device periodically wakes up and checks for a device to connect to. In one scenario, the vehicle 12 may be in a powered off state and the wireless communications device 30 may be in a low power mode or a sleep mode. In low power mode or the sleep mode, the device 30 may retain a low level of power such that it may periodically wake up and check for a device, such as a mobile device 90, to connect to. In another embodiment, the device 30 may be off (i.e., not supplied with any power) and BCM 40 (or another VSM 42) may periodically wake up the wireless communications device 30 so that it may attempt to connect to a device.

In one embodiment, during the times of the periodic cycle when the wireless communications device 30 is awake, the wireless communications device 30 may use wireless chipset 32 to listen for wireless communications. Alternatively or additionally, the wireless communications device 30 may use wireless chipset 32 to transmit a beacon signal or other signal such that the device 30's availability of a wireless connection is advertised to wireless devices that are in range and/or wireless devices that are able to communicate using the SRWC that device 30 is using or advertising. In one example, wireless chipset 32 may transmit a directed wireless message that includes a SRWC device identifier as an intended recipient of the message. In another embodiment, the chipset 32 may transmit a message that includes a key, or a message that is encrypted using a key that is known to the vehicle and known to SRWC devices that are authorized and/or authenticated and to which vehicle 12 desires to connect to. The SRWC device identifiers and/or key(s) may be received by the vehicle and/or the SRWC device from a computer 78 or remote facility 80.

Wireless communications device 30 may determine that a SRWC device is available for establishing a SRWC connection based on one or more wireless communications sent by and/or received from the SRWC device, such as a beacon signal sent by the SRWC device, a response to a beacon signal that was sent by the wireless communications device, or a response to a directed advertisement sent by the wireless communications device. The wireless communications device 30 may carry out subsequent communications with the SRWC device to establish a connection. The establishing of the connection may include exchanging certain information, such as public keys or device identifiers, and/or may include verifying information, such as pre-shared private keys and/or device identifiers. In step 210, it is determined whether a connection has been successfully established and, if so, the method 200 proceeds to step 215; otherwise, the method 200 proceeds to step 205.

In step 215, a communication setup is performed and, in one embodiment, the communication setup is performed at least in part by the wireless communications device 30. The communication setup may be separate from the established connection (see steps 205-210). The communication setup may include an authorization and/or an authentication of the SRWC device, as was previously discussed above. In the above-described scenario where the vehicle 12 is used in a car sharing service, both the vehicle 12 and the SRWC device 90 may be provided a virtual key, such as an advanced encryption standard (AES) key (e.g., a 128, 192, or 256 bit key). In this way, the wireless communications device 30 and/or other VSM of the vehicle may authenticate the SRWC device 90 and/or determine whether the SRWC device 90 is authorized to command the vehicle 12 to perform certain operations or to access certain components of the vehicle 12. The communication setup may also include the generation and/or issuance of rolling codes or keys to the SRWC device and/or vehicle by a remote device (e.g., a device at remote facility 80 or computer 78) or the vehicle 12. The rolling codes or keys may be smaller in length (i.e., shorter in bit-length) than the virtual key.

Additionally, or alternatively, the communication setup may include service discovery, which is used to discover a wireless service. As used herein, a wireless service is a service that is offered by one or more SRWC devices (the "servicing device") and/or used by one or more SRWC devices where the service is performed at least in part through wireless communications. Such services may be, for example, a printing service, an Internet connection service, a vehicle command service, a cellular voice call service, or a media content service. The servicing device may be any device capable of SRWC, such as the SRWC device 90 or vehicle communications device 30. The method 200 then proceeds to step 220.

In step 220, the wireless communications device 30 receives a wireless command message from the SRWC device. The wireless command message may include two portions: a data portion and an authorization portion. The data portion may include data that directly commands or requests that the vehicle carry out some operation or vehicle function (an "active command") or data that is used as a basis for carrying out one or more operations or functions (a "passive command"). For example, the vehicle may send a door unlock command (an exemplary "active command"). Or, the wireless command message may include data indicative of an imminent user interaction, such as a received signal strength indicator (RSSI), or the wireless command message may include a predictive user determination (both exemplary "passive commands"). In response to receiving the wireless command message, the vehicle may then determine one or more operations or vehicle functions to carry out. For example, in the case of the wireless command message including an active command, the vehicle may determine to carry out the command specified in the wireless command message. Or, in the case of the wireless command message including a passive command, the vehicle may then determine a vehicle function to carry out based on the passive command. The vehicle may either automatically carry out the vehicle function or may determine whether it is desirable to carry out the determined vehicle function and, if so, then carry of the vehicle function.

The wireless command message may also include an authorization portion. The authorization portion may be a segment of the wireless command message that is separate and/or distinct from the data portion or may be combined or incorporated into the data portion. For example, the authorization portion may include one or more authorization indicators, such as a virtual key or other information authorizing and/or authenticating the SRWC device to access or command the vehicle, such as a rolling code issued by the vehicle or by a remote device. Other authorization indicators that may be included as part of the authorization portion may be a checksum and/or a nonce that can then be checked, verified, or evaluated at the vehicle to ensure the wireless command message and/or the SRWC device is authenticated, non-corrupt, and/or authorized. In yet another embodiment, the authorization portion may be incorporated into the data portion in that the authorization portion comprises the encryption of the data portion using a key, such as the virtual key or a rolling code. In other embodiments, a virtual key may be separately sent or may be used to encrypt at least a part of the wireless message. Alternatively, a rolling code or key may be used instead or in addition to the virtual key. The method proceeds to step 225.

In an alternative embodiment, instead of waiting to receive a command from the SRWC device, the vehicle may automatically proceed to step 235. In one scenario, the vehicle may realize a predictive vehicle determination indicative of an imminent user interaction with the vehicle. For example, the vehicle may determine that a user is approaching the vehicle, that a user may momentarily start the vehicle (i.e., switch the vehicle from a powered off state to a powered on state), and/or that a user may momentarily access the vehicle (e.g., access/operate the infotainment unit). In any such scenario, it may be desirable, at least in some embodiments, to automatically proceed to step 240 even though the vehicle did not receive a command from the SRWC device. The determination that a user is approaching the vehicle, that a user may momentarily start the vehicle, or that a user may momentarily access the vehicle, may be made based on assessing a variety of different aspects of the vehicle (e.g., vehicle states), the SRWC, and/or other information, such as information pertaining to a user's request to use the vehicle. For example, a user may request from a car sharing service to use vehicle 12 at a certain time, and upon the vehicle performing steps 205-215 and determining that the present time is around (e.g., within a certain range of) the certain time as indicated in the request or reservation, then the vehicle may determine that the user is going to momentarily start or access the vehicle. In another embodiment, the vehicle may determine that a user is approaching the vehicle based on a signal strength indicator (e.g., Received Signal Strength Indicator (RSSI)) of one or more wireless messages that are sent by the SRWC device. Accordingly, the vehicle may, upon this determination, automatically proceed to step 235.

During or after any of the previous steps 205-220, the wireless communications device may exit the low power mode or the sleep mode and be set to a different operating mode or state, such as an "on" mode or state. In one embodiment, it may be desirable to provide the wireless communications device 30 power and not have the device periodically power down or switch to a state of lower power, as this may, in some instances, affect the capabilities or operations of the device 30.

In step 225, the wireless message and/or command is checked or parsed to determine if it is valid. A valid wireless command message (i.e., a wireless command message that is valid) is a wireless command message that includes the proper credentials (e.g., keys, identifiers) and that is formed properly. The proper credentials may be determined if the wireless command message contains a corresponding or matching authorization indicator, such as a key (e.g., rolling code, rolling key, or virtual key) and/or a device identifier (e.g., a MAC address). A wireless command message is formed properly if it is in an appropriate form, which may be dictated by the SRWC protocol, by a remote system (e.g., the car sharing service), device 30, by the vehicle, or by a protocol known to one or more of these devices. The method proceeds to step 235 if the message is formed properly; otherwise the method proceeds to step 230.

In step 230, the vehicle may provide an indication that the message was not formed properly. This may include sending a wireless message to the SRWC that includes information or data indicating the failure, and may include a specific error code. Additionally, the vehicle may provide an indication to the user via the SRWC device or via one or more vehicle user interfaces. The error codes or indication of the failure may be stored in memory 36 of the wireless communications device 30 or other vehicle memory device. In some embodiments, the process at any of steps 205-230 may detect that a wireless device is attempting to obtain unauthorized access to the vehicle. This may be the result of an improper wireless message/command at steps 225, 230, or may be the result of an intentional replay or other attack for mischievous or malicious purposes. Where an unauthorized access attempt is detected, the vehicle may provide notification of this to a telematics service (e.g., or vehicle administrator. The method may then proceed back to step 220.

In step 235, the vehicle may provide an indication that the message was formed properly. This may include sending a wireless message to the SRWC that includes information or data indicating the success. Additionally, the vehicle may provide an indication to the user via the SRWC device or via one or more vehicle user interfaces. The indication of the failure may be stored in memory 36 of the wireless communications device 30 or other vehicle memory device. The method then proceeds to step 240.

In step 240, the vehicle may execute the vehicle function, which may be, for example, a vehicle unlock command. In one embodiment, the vehicle may query one or more vehicle system modules, such as BCM 40 or VSMs 42, to determine whether it is desirable to execute the command. For example, if the BCM 40 indicates that the vehicle is already unlocked, the vehicle may disregard the command. Alternatively or additionally, the vehicle may query the SRWC device 90 or a remote device to determine if the command should be executed. For example, it may be desirable to unlock the vehicle only when it is determined that the user is within a certain proximity of the vehicle, such as within 15 feet.

Vehicle 12 may also carry out a suite of operations in response to receiving a wireless command message from the SRWC device (see step 220) and/or in response to a predictive user determination that is indicative of imminent user interaction. Herein, a suite of operations refers to a collection of commands, instructions, functions, or operations (such as those exemplary vehicle functions described above). Or, a suite of operations may refer to a preconfigured process that includes two or more functions or operations. The vehicle may use various vehicle module states, SRWC device information or states, reservation information (e.g., reservation times), or other environmental information (e.g., predicted or present weather or temperature) to determine a suite of operations to execute.

In one scenario where vehicle 12 is reserved for a certain time as part of a car sharing service, the vehicle may, upon reaching step 245, carry out an initialization process, wherein the initialization process comprises an initialization suite of operations. The initialization suite of operations may include initializing or booting one or more vehicle system modules, starting the vehicle, unlocking the vehicle, downloading content from the SRWC device or remote facility (e.g., information specific to the user or reservation including media content), providing air conditioning or heating, heating or cooling the passenger seats, and/or a variety of other operations or functions that may be desirable or provide the user a desirable experience. The method 200 then ends.

During or after any of the previous steps, if the vehicle determines that an unauthorized or unauthenticated device is attempting to access the vehicle, command the vehicle to perform some operation, and/or establish a SRWC connection with the vehicle, the vehicle may carry out one or more security measures, including locally issuing a vehicle disable command via the communication bus 44. Additionally, the vehicle may request a remote vehicle disable (RVD) command via a Wi-Fi™ hotspot connection or a cellular connection to a remote device, such as computer 78 or a device at remote facility 80. Upon receiving an affirmative response to the request, the vehicle may issue a vehicle disable command. The vehicle disable command may include locking the vehicle, disabling the primary propulsion system or ignition, disabling one or more other vehicle modules (e.g., wireless communications device 30, VSMs 42), and/or carrying out one or more other security measures.

With reference to FIG. 3, there is shown an embodiment of a method 300 of automatically carrying out at least one vehicle function at a vehicle. The method 300 may be carried out in part or in whole by the wireless communications device 30. Method 300 may be used in various scenarios, such as in conjunction with or as part of a car sharing service. In some embodiments, method 300 may be carried out as part of the same overall process as method 200, which is described above. At least in some embodiments, method 300 may be desirable when a user with a SRWC device terminates the vehicle ignition or primary propulsion system (i.e., effects a vehicle state change from a powered on state to a powered off state).

Method 300 begins with step 310, where the vehicle monitors a SRWC device. The SRWC device may be a device that is used by a vehicle user in conjunction with a car sharing service. For example, the SRWC device may be a smartphone or other mobile device 90 that the vehicle user used to reserve vehicle 12. A connection between the wireless communications device 30 included in vehicle 12 and the SRWC device 90 may be established using the same or similar steps as those discussed above in step 205-210 of FIG. 2. The method proceeds to step 320.

In step 320, it is determined whether the established connection is lost. The established connection may be deemed lost when a wireless message transmitted by vehicle 12 to the SRWC device 90 is lost. Or, the connection may be deemed lost when the SRWC device 90 does not respond to wireless messages sent by vehicle 12 or when there has been no wireless communications for a predetermined amount of time. Or, the connection may be deemed lost based on a combination of any of the previous examples. If the connection is lost, the method 300 proceeds to step 330; otherwise, the methods proceeds to step 310.

In step 330, after determining the connection is lost and/or after passage of a predetermined amount of time, the vehicle may carry out shutdown logic. The shutdown logic may comprise a suite of operations, specifically a shutdown suite of operations. The shutdown suite of operations may include sending a message via the communications bus 44 to one or more VSMs indicating the vehicle is shutdown, setting one or more VSMs or other vehicle components to a low power mode or sleep mode, locking the vehicle doors, and/or disabling certain VSMs or other vehicle components. In one example, the wireless communications device 30 may be set to a low power mode or sleep mode, such as a mode where the device 30 periodically wakes up and checks for SRWC connections to SRWC devices, as discussed above. In some embodiments, the shutdown suite of operations may set the vehicle into a state in which it is ready to carry out method 200. The method 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of providing one or more vehicle functions at a vehicle, the method comprising:

when the vehicle is in a powered off state, periodically scanning for short-range wireless communication (SRWC) devices using a SRWC chipset and, as a result of the scanning, receiving a connection request from a mobile device;

in response to receiving the connection request from the mobile device, establishing a SRWC connection with the mobile device using the SRWC chipset;

after establishing the SRWC connection, authorizing the mobile device to access one or more vehicle functions;

after the mobile device is authorized, performing an initialization suite of operations, wherein the initialization suite of operations includes initializing at least one vehicle system module, and wherein the initialization suite of operations is performed in response to a predictive user determination indicative of an imminent user interaction with the vehicle, wherein the user interaction comprises at least one of the following: user approach to the vehicle, user operation of the vehicle, or user access to the vehicle; and executing the initialization suite of operations at the vehicle;

wherein the method further comprises receiving a second connection request from another wireless device, detecting that the wireless device is attempting to obtain unauthorized access to the vehicle and, in response to the detection, wirelessly sending a notification of the unauthorized attempt to a remote device.

2. The method of claim 1, further comprising the step of receiving a wireless command message from the mobile device, wherein the wireless command message includes an active command and/or a passive command, and wherein the predictive user determination is made based on the wireless command message.

3. The method of claim 2, further comprising the steps of:
determining whether the wireless command message is valid;
when it is determined that the wireless command message is valid, then carrying out the executing step; and
when it is determined that the wireless command message is not valid, then waiting to receive another wireless command message from the mobile device.

4. The method of claim 2, wherein the wireless command message includes an active command that specifies a vehicle function to be carried out by the vehicle, and further comprising the step of carrying out the specified vehicle function at the vehicle.

5. The method of claim 1, further comprising the step of receiving a message from a remote device, wherein the message includes an authorized virtual vehicle key.

6. The method of claim 5, wherein the authorizing step includes the following:
receiving a wireless message from the mobile device, wherein the wireless message includes a virtual key;
comparing the virtual key to the authorized virtual vehicle key; and
authorizing the mobile device when the virtual key corresponds to the authorized virtual vehicle key.

7. The method of claim 1, further comprising the steps of:
detecting a loss of the SRWC connection between the mobile device and the vehicle; and
in response to detecting the loss of the SRWC connection, carrying out a shutdown suite of operations, wherein the shutdown suite of operations includes setting the wireless communications device to operate in a low-power mode or sleep mode, wherein the wireless communications device in the low-power or sleep mode periodically scans for SRWC devices.

8. A method of providing one or more vehicle functions at a vehicle, the method comprising:
when the vehicle is in a powered off state, periodically scanning for short-range wireless communication (SRWC) devices using a SRWC chipset and, as a result of the scanning, receiving a connection request from a mobile device;
in response to receiving the connection request from the mobile device, establishing a SRWC connection with the mobile device using the SRWC chipset;
after establishing the SRWC connection, authorizing the mobile device to access one or more vehicle functions;
after the mobile device is authorized, performing an initialization suite of operations, wherein the initialization suite of operations includes initializing at least one vehicle system module, and wherein the initialization suite of operations is performed in response to a predictive user determination indicative of an imminent user interaction with the vehicle, wherein the user interaction comprises at least one of the following: user approach to the vehicle, user operation of the vehicle, or user access to the vehicle; and
executing the initialization suite of operations at the vehicle;
wherein the method further comprises the steps of:
detecting that an unauthorized or unauthenticated device is attempting to access the vehicle, attempting to command the vehicle to perform some operation, and/or attempting to establish a connection with the vehicle; and
in response to the detection, carrying out one or more security measures, wherein the one or more security measures include locally issuing a vehicle disable command that disables one or more vehicle system modules.

9. The method of claim 8, wherein the vehicle disable command disables an engine control unit or body control unit that is included in the vehicle.

10. A method of automatically carrying out at least one vehicle function at a vehicle, the method comprising:
when the vehicle is in a powered off state, periodically scanning for short-range wireless communication (SRWC) devices using a SRWC chipset and, as a result of the scanning, receiving a connection request from a mobile device;
in response to receiving the connection request from the mobile device, establishing a SRWC connection with the mobile device using the SRWC chipset;
after establishing the SRWC connection, authorizing the mobile device to access one or more vehicle functions;
after the mobile device is authorized, receiving a wireless command message from the mobile device, wherein the wireless command message indicates a vehicle function to be performed at the vehicle;
determining that the received wireless command message is valid;
when it is determined that the wireless command message is valid, then:
performing the vehicle function specified in the wireless command message; and
executing an initialization suite of operations, wherein the initialization suite of operations includes initializing at least one vehicle system module, wherein the initialization suite of operations is performed in response to a predictive user determination indicative of an imminent user interaction with the vehicle, wherein the user interaction comprises at least one of the following: user approach to the vehicle, user operation of the vehicle, or user access to the vehicle; and when it is determined that the wireless command message is not valid, then waiting to receive another wireless command message from the mobile device;

wherein the method further comprises the steps of:
- detecting that the SRWC connection between the mobile device and the vehicle is lost; and
- in response to detecting that the SRWC connection is lost, carrying out a shutdown suite of operations, wherein the shutdown suite of operations includes setting the wireless communications device to operate in a low-power mode or sleep mode, wherein the wireless communications device in the low-power or sleep mode periodically scans for SRWC devices.

11. The method of claim 10, further comprising the steps of:
- detecting that an unauthorized or unauthenticated device is attempting to access the vehicle, attempting to command the vehicle to perform some operation, and/or attempting to establish a connection with the vehicle; and
- in response to the detection, carrying out one or more security measures, wherein the one or more security measures include locally issuing a vehicle disable command that disables one or more vehicle system modules.

12. The method of claim 11, wherein the vehicle disable command disables at least a portion of an engine control unit or a body control module that is included in the vehicle.

13. The method of claim 10, wherein the determining step further comprises the steps of verifying one or more authorization indicators that are included in the wireless command message.

14. The method of claim 10, further comprising the step of receiving a message from a remote device, wherein the message includes an authorized virtual vehicle key.

15. The method of claim 14, wherein the authorizing step includes the following:
- receiving a wireless message from the mobile device, wherein the wireless message includes a virtual key;
- comparing the virtual key to the authorized virtual vehicle key; and
- authorizing the mobile device when the virtual key corresponds to the authorized virtual vehicle key.

16. The method of claim 10, further comprising receiving a second connection request from another wireless device, detecting that the wireless device is attempting to obtain unauthorized access to the vehicle and, in response to the detection, wirelessly sending a notification of the unauthorized attempt to a remote device.

* * * * *